United States Patent
Ramachandra

(10) Patent No.: US 9,394,697 B2
(45) Date of Patent: Jul. 19, 2016

(54) FLOORING SYSTEM

(71) Applicant: ARMSTRONG WORLD INDUSTRIES, INC., Lancaster, PA (US)

(72) Inventor: Sunil Ramachandra, Lancaster, PA (US)

(73) Assignee: AFI Licensing LLC, Lancaster, PA (US)

( * ) Notice: Subject to any disclaimer, the term of this patent is extended or adjusted under 35 U.S.C. 154(b) by 0 days.

(21) Appl. No.: 14/566,274

(22) Filed: Dec. 10, 2014

(65) Prior Publication Data

US 2016/0168864 A1 Jun. 16, 2016

(51) Int. Cl.
*E04B 2/00* (2006.01)
*E04F 15/02* (2006.01)
*E04F 15/10* (2006.01)
*B32B 37/12* (2006.01)

(52) U.S. Cl.
CPC ....... *E04F 15/02016* (2013.01); *B32B 37/1207* (2013.01); *E04F 15/10* (2013.01); *E04F 2201/0107* (2013.01); *E04F 2201/07* (2013.01)

(58) Field of Classification Search
CPC ................ E04F 15/02016; E04F 15/10; E04F 2201/0107; E04F 2201/07; E04F 15/02; B32B 37/1207
USPC ........................................................ 52/588.1
See application file for complete search history.

(56) References Cited

U.S. PATENT DOCUMENTS

| | | | |
|---|---|---|---|
| 3,480,492 A | 11/1969 | Hauser | |
| 3,655,501 A | 4/1972 | Tesch | |
| 4,711,681 A | 12/1987 | Grossmann et al. | |
| 4,906,497 A | 3/1990 | Hellmann et al. | |
| 5,902,663 A | 5/1999 | Justesen et al. | |
| 7,644,553 B2 * | 1/2010 | Knauseder | C09J 5/00 156/304.5 |
| 8,453,411 B2 * | 6/2013 | Braun | C09J 5/00 428/425.1 |
| 8,726,604 B2 * | 5/2014 | Hannig | E04F 15/02 52/516 |
| 2002/0127374 A1 | 9/2002 | Spratling | |
| 2002/0148551 A1 * | 10/2002 | Knauseder | C09J 5/00 156/182 |
| 2002/0189747 A1 * | 12/2002 | Steinwender | B27G 11/00 156/157 |
| 2005/0016107 A1 * | 1/2005 | Rosenthal | B32B 27/04 52/578 |
| 2006/0053724 A1 * | 3/2006 | Braun | C09J 5/00 52/578 |
| 2010/0115874 A1 | 5/2010 | Nilsson | |
| 2011/0265409 A1 * | 11/2011 | Pien | E04B 5/026 52/309.1 |
| 2012/0042602 A1 * | 2/2012 | Buckwalter | C09J 7/0217 52/741.1 |
| 2012/0317911 A1 * | 12/2012 | Huang | E04F 15/02 52/309.1 |
| 2013/0119710 A1 | 5/2013 | De Luca et al. | |
| 2014/0087070 A1 | 3/2014 | Cypcar | |

FOREIGN PATENT DOCUMENTS

| | | |
|---|---|---|
| DE | 10222994 | 12/2003 |
| JP | 2009545686 | 12/2009 |

* cited by examiner

*Primary Examiner* — Mark Wendell

(57) ABSTRACT

Described herein are flooring systems comprising: a first floor panel and a second floor panel, each of the first and second floor panels comprising: a top surface, a bottom surface, and a plurality of peripheral edges extending between the top and bottom surfaces; and a coupling surface formed on one peripheral edge; the coupling surfaces of the first and second floor panels being disposed proximate to each other forming a joint; and a thermally activated solid adhesive interspersed between the coupling surfaces of the first and second floor panel. Methods of installing these systems are also described.

18 Claims, 6 Drawing Sheets

FLOORING SYSTEM

FIELD OF THE DISCLOSURE

The present invention relates to flooring systems with bonded joints.

BACKGROUND

Many types of flooring systems and methods for bonding individual floor panels together have been used. The edges between adjacent floor panels are sometimes bonded together for improved resistance to curling, gapping, or ledging at the joints due to changes in environmental conditions such as temperature and/or humidity. The bonded joints further help reduce or eliminate squeaking at the joints when walked over. The floor panel edges may be bonded together as each joint is formed. However, this prevents adjustment or realignment of sections of flooring already laid if necessary due to the already bonded flooring joints. An improved flooring system is desirable.

SUMMARY

A flooring system is provided which facilitates adjustment of floor panels already positioned on a substrate. In one embodiment, an ultrasonic welding technique may be used which allows the installer to "activate" the installation after they are satisfied with the layout. A thermally activated solid adhesive may be applied to the joints between two pieces of flooring which may be resilient plank or sheet flooring in some embodiments. In some embodiments, the thermally activated adhesive may be activated by applying ultrasonic vibrations to the joint between the two pieces of flooring, which heats and melts the adhesive to rapidly weld the flooring pieces together forming a secure bond.

In some embodiments, a flooring system includes a first floor panel and a second floor panel. Each panel comprises a top surface, a bottom surface, a plurality of peripheral edges extending between the top and bottom surfaces, and a coupling surface formed on one peripheral edge. The coupling surfaces of the first and second floor panels are disposed proximate to each other forming a joint. A thermally activated solid adhesive is interspersed between the coupling surfaces of the first and second floor panel, wherein the adhesive is comprised of a material that does not melt and bond the coupling surfaces of the first and second floor panel together until the creation of heat in the joint. In some embodiments, the solid adhesive may be a heat-activated thermal bonding film. The film may be heated using ultrasonic vibrations in some embodiments.

In other embodiments, a flooring system includes a first floor panel and a second floor panel, each of the first and second floor panels comprising: a top surface, a bottom surface, a pair of longitudinal shiplap edges, and a pair of lateral edges; and a coupling surface formed on each shiplap edge. In some embodiments, the coupling surface of one shiplap edge of the first floor panel is disposed proximate to the coupling surface of one shiplap edge of the second floor panel forming an adjacent pair of coupling surfaces. In some embodiments, a thermally activated solid adhesive is interspersed between the adjacent pair of coupling surfaces of the first and second floor panel, wherein the adhesive is comprised of a material that does not melt and bond the adjacent pair of coupling surfaces together until the creation of heat in the joint.

In further embodiments, a method for installing a flooring system is provided. In some embodiments, the method includes the steps of: providing a first floor panel and a second floor panel, each floor panel comprising a top surface, a bottom surface, a plurality of peripheral edges extending between the top and bottom surfaces, and a coupling surface formed on one peripheral edge; applying a thermally activated solid adhesive to the coupling surface of the first floor panel; positioning the first floor panel on a flooring substrate; positioning the second floor panel on the flooring substrate adjacent to the first floor panel; locating the coupling surface of the second floor panel proximate to the solid adhesive; heating the solid adhesive; and bonding the coupling surfaces together. In some embodiments, the heating step may include applying an effective amount of acoustical energy in the form of ultrasonic vibrations sufficient to activate and melt the film to bond the first and second floor panels together.

BRIEF DESCRIPTION OF THE DRAWINGS

The features of the exemplary embodiments of the present invention will be described with reference to the following drawings, where like elements are labeled similarly, and in which.

Figure 1:
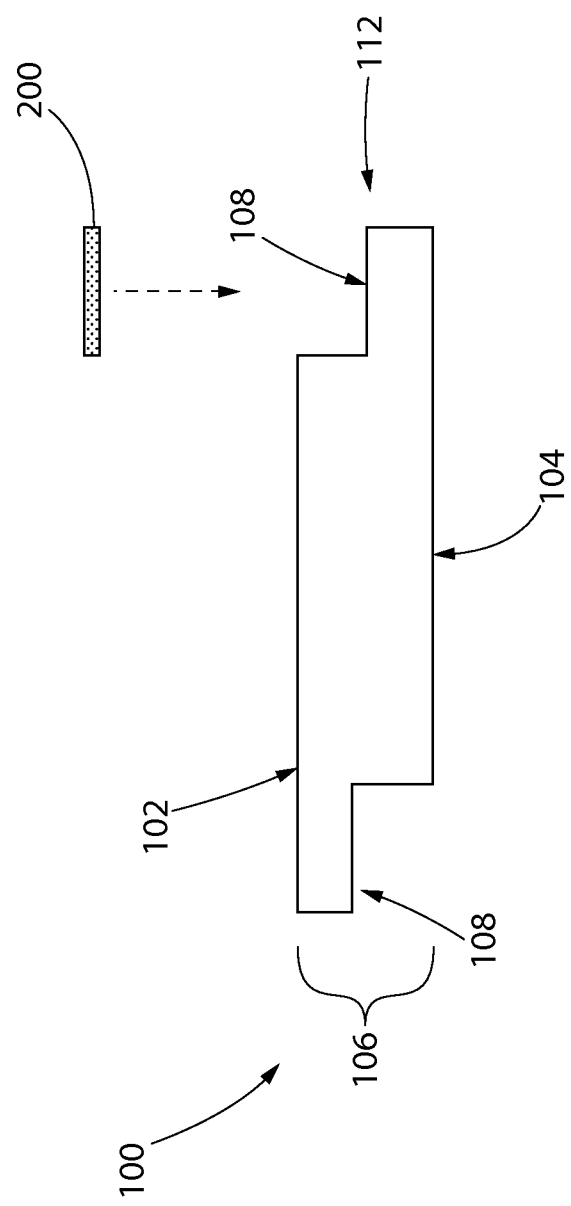
FIG. 1 is a side elevation of a floor panel.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Figure 2:
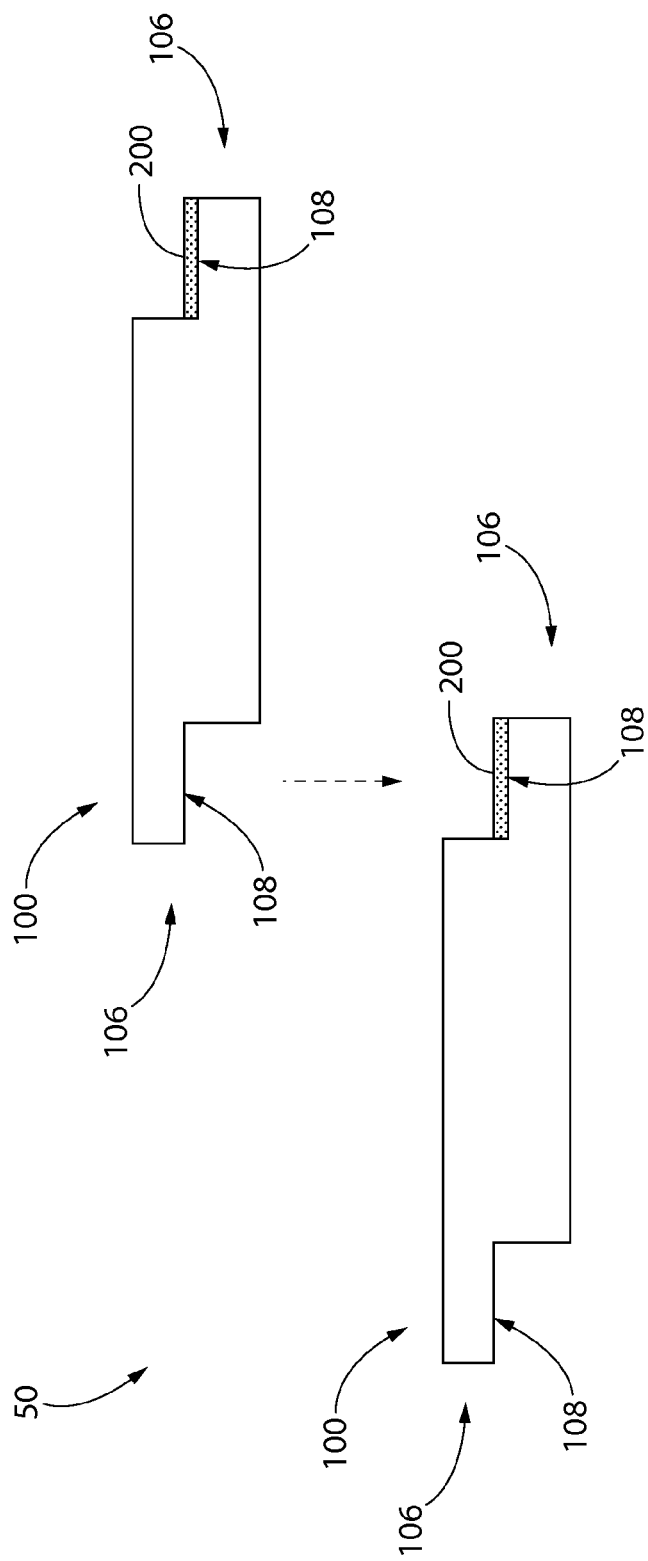
FIG. 2 is an exploded side elevation view of flooring system formed with the floor panels of FIG. 1.

FIGS. 1 and 2 depict an exemplary embodiment of a floor panel 100 and related flooring system 50. Floor panels 100 may have a generally flattened body with a substantially greater horizontal width and length than vertical thickness as shown. Floor panel 100 includes a top surface 102, bottom surface 104, and peripheral sides 106 extending therebetween along the perimeter of the floor panel. Top and bottom surfaces 102, 104 may be generally planar and arranged substantially parallel to each other in one non-limiting embodiment. Peripheral sides 106 may have numerous possible configurations including flat, stepped or shiplap, angled, or various combinations thereof and other shapes.

In some embodiments, floor panels 100 may have a rectilinear shape, such as without limitation square or rectangular (e.g. planks). Each floor panel 100 includes four corners 110 and linear peripheral edges 112 formed by peripheral sides 106 which extend around the perimeter of the panel between the corners. Each floor panel 100 may include a first pair of opposing peripheral sides 106 and edges 112, and a second pair of opposing peripheral sides and edges arranged perpendicular to the first pair.

Figure 3:
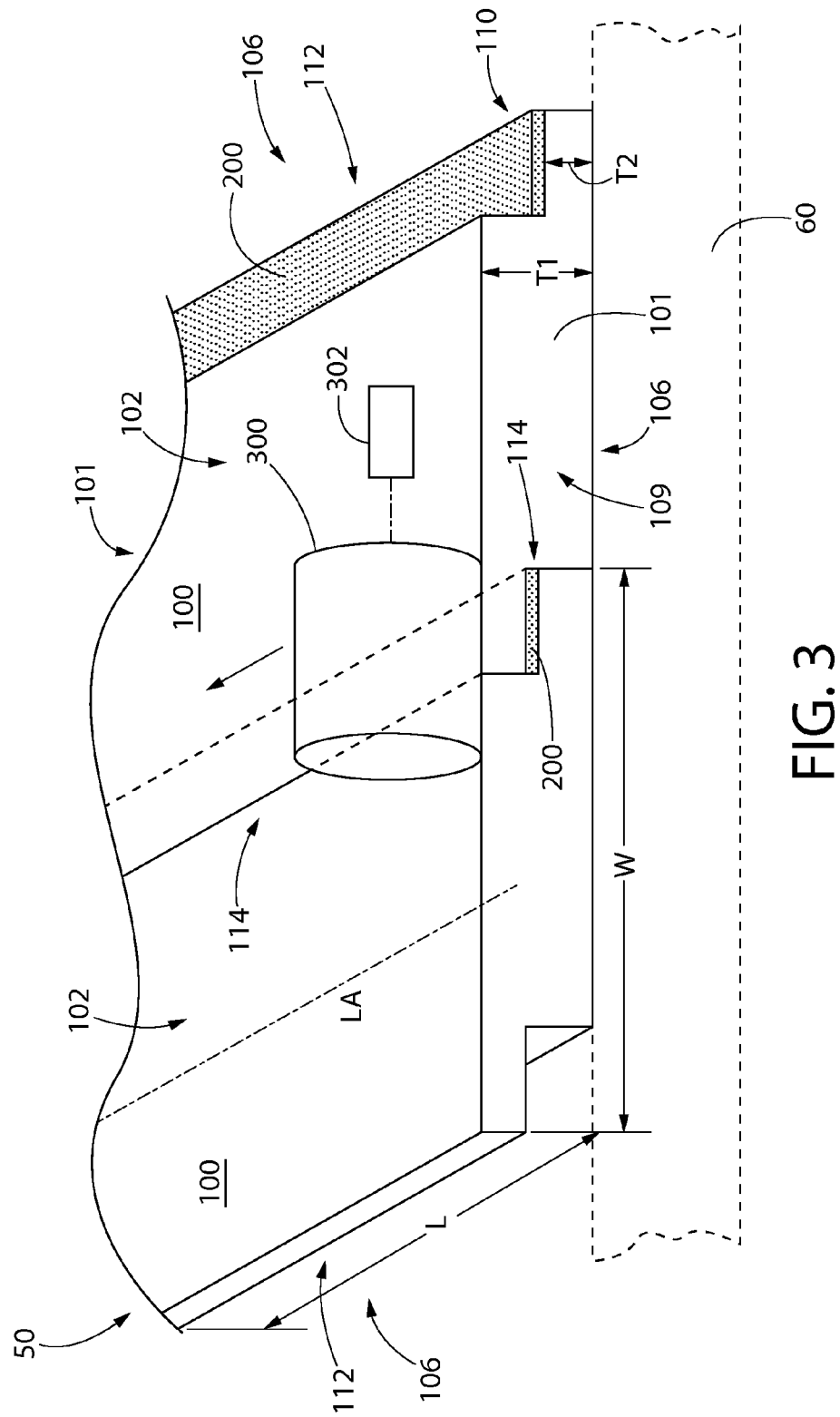
FIG. 3 is a top perspective view of a flooring system showing individual floor panels during a process of thermally bonding the edges of the panels together.

The present flooring system will now be further described for convenience without limitation to floor panels having a rectangular or plank form best shown in FIG. 3. Referring to FIGS. 1-3, the plank flooring panel 100 has an axially elongated shape extending parallel to longitudinal axis LA defined by the plank. This floor panel 100 defines a width W (measured transversely to longitudinal axis LA) defined by opposing ends 101 on the shorter lateral peripheral sides 106 and a length L (measured parallel to longitudinal axis LA) defined by the opposing longer longitudinal peripheral sides 106. In the plank formed of the floor panel 100, the length L is larger than the width W, and may be larger than twice the width W in some embodiments, and larger than six times the width in some embodiments. Typical plank lengths L may be on the order of 36-48 inches and widths W may be 4.5-6 inches.

The longitudinal peripheral sides 106 and associated edges 112 (oriented parallel to longitudinal axis LA) each include a planar coupling surface 108 configured and arranged for attachment to mating coupling surfaces of adjoining floor panels. The lateral peripheral sides 106 and associated edges 112 (arranged transversely to longitudinal axis LA) may be butt or straight cut edges which define planar end surfaces 109 that face outwards from each end 101 for abutting mating end surfaces of adjoining floor panels laid end-to-end with the present panel 100.

In certain embodiments shown in FIGS. 1-3, the longitudinal edges 112 may have a shiplap edge profile or detail with a terminal peripheral edge portion having a thickness T2 which is less than the thickness T1 of the central portion of the floor panel body. This forms a stepped edge profile. One longitudinal edge 112 includes an upward facing coupling surface 108 and the other includes a downward facing coupling surface. When the floor panels 100 are laid side to side and installed on a flooring substrate 60, the upward and downward surfaces 108 on adjoining tiles are disposed proximate to each other and vertically aligned.

Any suitable flooring material may be used for floor panels 100. In one embodiment, the floor panels 100 may be a resilient floor panel. In one non-limiting example, the floor panels may be resilient vinyl flooring panel, such as planks or squares which are laid in edge-to-edge relationship on a flooring substrate. Such flooring materials may have representative non-limiting thicknesses T1 of 0.11-0.16 inches with top wear layers having representative non-limiting thicknesses of 0.012-0.020 inches. Other types of synthetic and natural flooring materials may be used.

In some embodiments, the floor panels may be linoleum based floor panels. In some embodiments, the floor panels may be linoleum based floor panels such as planks or squares which are laid in edge-to-edge relationship on a flooring substrate.

According to one aspect, the coupling surfaces 108 formed on the longitudinal peripheral sides 106 and edges 112 may be bonded together with a solid type adhesive which is placed and bonded therebetween. Solid adhesives are distinguishable from liquid or semi-liquid adhesives which have a viscosity that allows such adhesives to flow and be applied and spread via a spray or brush. Solid adhesives further have a finite shape and are structurally self-supporting unlike liquids or semi-liquid adhesives which are incapable of retaining a shape independent of the surface to which they are applied.

In one embodiment, the solid adhesive may be a thermally activated thermoplastic solid adhesive film 200. A suitable non-limiting example of a thermally activated film which may be used is 3M Bonding Film 615, a flexible thermoplastic adhesive bonding film, which is available from 3M Corporation of St. Paul, Minn. This film is formed of a non-curing polyester thermoplastic material. Such solid adhesive films 200 do not form a bond until thermally activated and melted. Advantageously, this allows the floor installer to lay a section of flooring or the entire flooring prior to thermally activating the film. This allows any needed adjustment in the floor layout or installation to be made prior to bonding the individual floor panels or planks together. The bonding film may be packaged on a release coated paper liner to facilitate placement on the floor panel coupling surfaces 108.

In some embodiments, the bonding film may be formed of material having low temperature bonding properties which reduces potential warping of the floor panels to activate the adhesive. Accordingly, such an adhesive film does not require special thermal curing equipment or setup in a factory environment, thereby being ideal for in-situ formation of the bond between adjoining floor panels in the field. Typical bonding temperatures used may be approximately 280 degrees F. which is sufficient to bond the edges of the floor panels 100 to be joined. In some embodiments, the adhesive is activated by acoustic vibration having a frequency in the range of from about 15 kHz to about 50 kHz. In some embodiments, the adhesive comprises a thermoplastic material. In some embodiments, the thermoplastic material is selected from a polyester, a polyimide, and a combination thereof. In other embodiments, the thermoplastic material comprises a non-curing thermoplastic material.

In some embodiments, the heat necessary to activate the film of solid adhesive 200 may be produced via applying acoustical energy such as ultrasonic vibrations to the film after placement of the floor panels on the flooring substrate 60, as shown in FIG. 3 and further described herein. In some embodiments, high-frequency vibrations are applied to the solid adhesive film 200 by a vibrating acoustic tool, referred to in the art as an acoustical "horn or sonotrode." In some embodiments, the horn transmits vibratory energy through the floor panels in the joint area to the solid adhesive film 200, where it is converted to heat through friction that thermally activates the adhesive.

FIG. 3 schematically depicts an acoustical ultrasonic unit 302 configured to generate and transmit acoustical energy for thermally activating the solid adhesive film 200. Ultrasonic unit 302 may generally include a solid-state power supply, converter/booster/horn stack, and an actuator 300 which provides horn contact with the flooring panels 100. The ultrasonic unit converts 50/60 Hz current to electrical energy (e.g. 15, 20, 30, 40 or 50 kHz in certain embodiments) through the power supply. This high frequency electrical energy is supplied to the converter that transforms it to vibrational mechanical motion at ultrasonic frequencies. The vibrational motion may then be transmitted through an amplitude-modifying booster to the horn. The horn then transfers this vibrational energy directly to the actuator for transmission to the solid adhesive film 200 through the top surface(s) 102 of floor panels 100 which thermally activates the film.

Actuator 300 is configured to contact the top surface 102 of the floor panel 100 in a manner which prevents damage or marring the floor finish. Any suitable type and shape of actuator 300 may be used. For example, in the embodiment shown in FIG. 3, the actuator 300 may be a roller which can be rolled along the joint 114 over the solid adhesive film 200 disposed beneath the top surface 102 of one of the floor panels 100. The depth of the film 200 beneath the top surface 102 may affect the amount of acoustical energy required to effectively heat and activate the adhesive film, which can be increased or decreased using the ultrasonic unit 302 controls. In other embodiments, the actuator 300 may be a non-rolling wand which slideably engages the top surface 102 of the floor panels 100 along the joint 114. Other forms and type of actuators 300 may be used and the invention is not limited in this regard.

Figure 4:
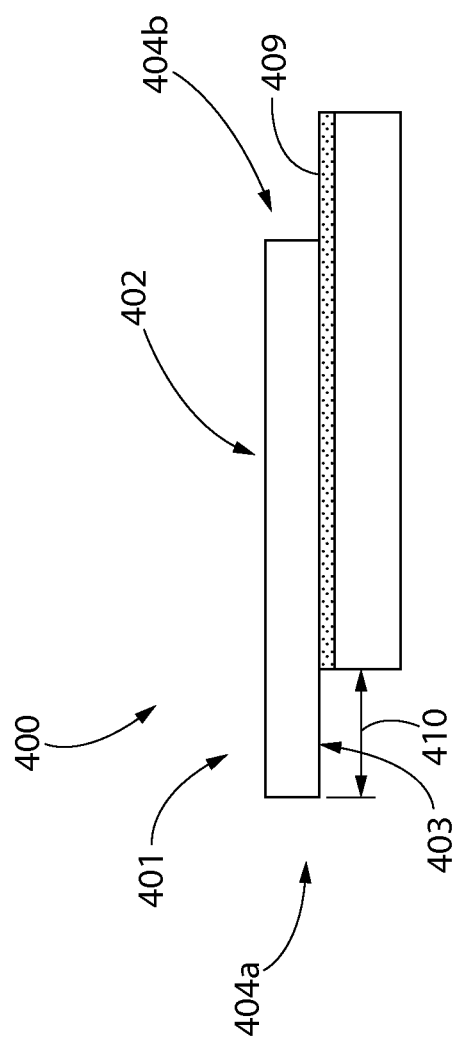
FIG. 4 is a side elevated view of an exemplary multi-layer floor panel of the present invention, wherein a second offset marginal portion is covered by a thermally activated solid adhesive.
Figure 5:
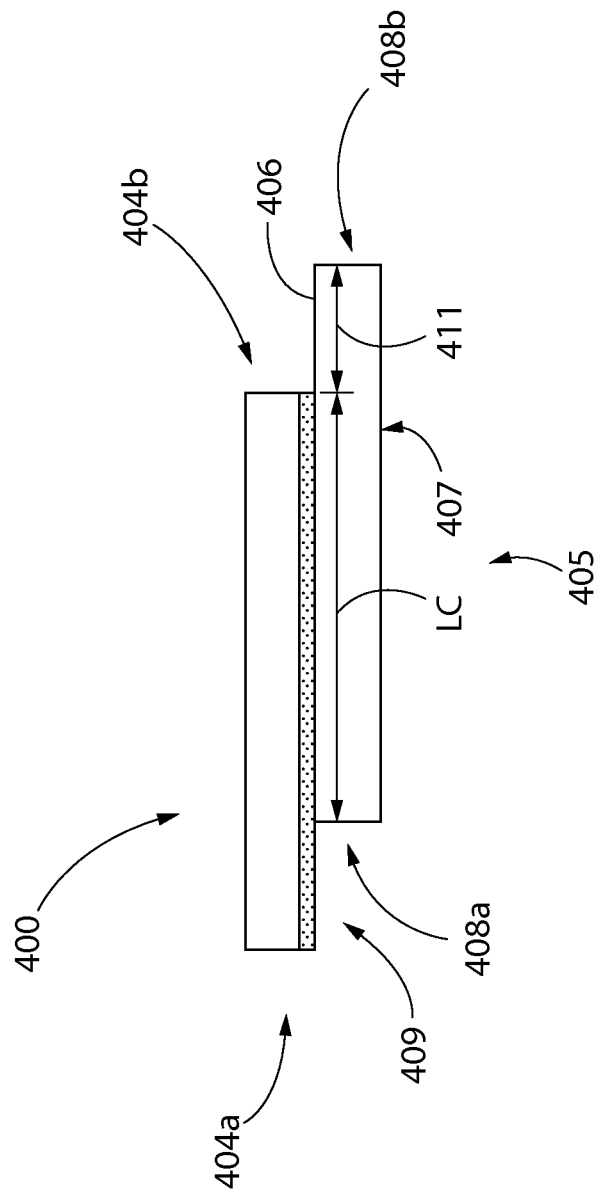
FIG. 5 is a side elevated view of an exemplary multi-layer floor panel of the present invention, wherein a first offset marginal portion is covered by a thermally activated solid adhesive.
Figure 6:
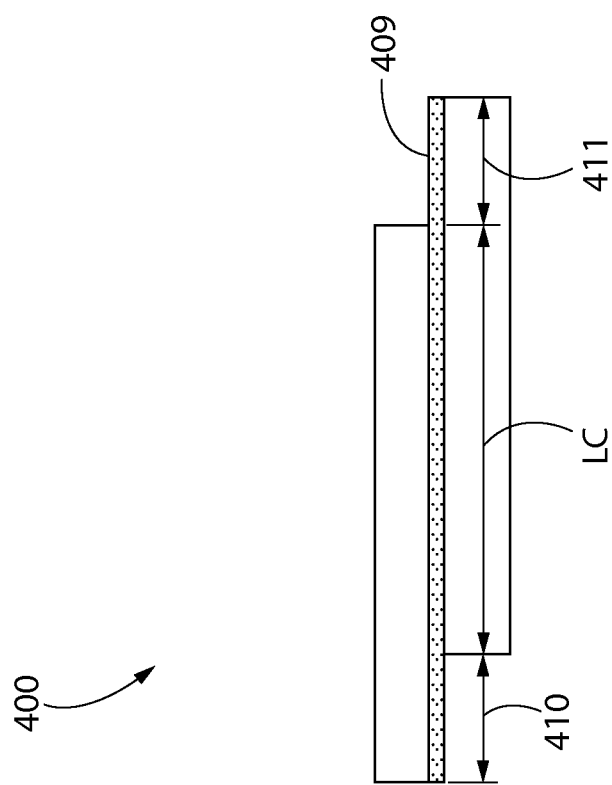
FIG. 6 is a side elevated view of an exemplary multi-layer floor panel of the present invention, wherein the third layer spans covers the first and second offset marginal portions and spans the length of the coupling surfaces of the first and second layers.

As shown in FIGS. 4-6, some embodiments of the present invention provide a flooring system comprising a plurality of multi-layer floor panels, each floor panel 400 comprising: a first layer 401 having a top surface 402, a bottom surface 403, and a plurality of peripheral edges 404a, 404b, extending between the top and bottom surfaces; a second layer 405 having a top surface 406, a bottom surface 407, and a plurality of peripheral edges 408a, 408b, extending between the top and bottom surfaces; and a third layer comprising a thermally activated solid adhesive 409; wherein the first layer and second layers are coupled in an offset relationship; wherein said offset coupling of said first and second layers defines a first offset marginal portion 410 and a second offset marginal portion 411, the first offset marginal portion 410 extending beyond at least one of the peripheral edges of the second layer, and the second offset marginal portion 411 extending beyond at least one of the peripheral edges of the first layer. In some embodiments, the third layer covers at least a part of the first or second marginal portions and is interspersed between the coupling surfaces of the first and second layers.

In some embodiments, the third layer substantially covers the first offset marginal portion 410. In some embodiments, the third layer completely covers the first offset marginal portion 410. In some embodiments, the third layer substantially covers the second offset marginal portion 411. In some embodiments, the third layer completely covers the second offset marginal portion 411.

In some embodiments, the third layer completely covers the first offset marginal portion 410 and spans the length of the coupling surfaces LC of the first and second layers. In some embodiments, the third layer completely covers the second offset marginal portion 411 and spans the length of the coupling surfaces LC of the first and second layers. In some embodiments, for example as shown in FIG. 6, the third layer completely covers the first and second offset marginal portions and spans the length of the coupling surfaces LC of the first and second layers.

In those embodiments wherein a floor panel comprises a third layer that covers only one of the first or second offset marginal portions, an adjacent floor panel will ordinarily comprise a third layer that covers at least the counterpart offset marginal portion. For example, if a first floor panel comprises a third layer that covers only the first offset marginal portion, an adjacent floor panel will comprise a third layer covering its second offset marginal portion, at a minimum.

In some embodiments, the thermally activated solid adhesive comprises a matrix. In some embodiments, the matrix comprises a plurality of tortuous pathways. In some embodiments, the tortuous pathways enhance the ability of the acoustic energy to be evenly distributed throughout the adhesive matrix, which improves the efficiency and homogeneity of the adhesive activation.

While intending not to be bound by theory, the present inventors believe that the use of a third layer that spans the length of the coupling surfaces of the first and second layers forms an integral mass of the thermally activated solid adhesive; which upon activation, provides greater stability to not only a single floor panel, but across the entirety of the flooring system. The cohesive forces between the interconnected third layers of adjacent floor panels are believed to be responsible for the enhanced performance and durability demonstrated by certain embodiments of the present invention.

Acoustical ultrasonic units and actuators are available from Branson Ultrasonics Corp. of Danbury, Conn.

Example

A thermally activated solid adhesive film (2.5 mil thick 3M Bonding Film 615) is applied at a shiplap joint of a Luxe brand type flooring product (resilient vinyl plank flooring) available from Armstrong World Industries, Inc. of Lancaster, Pa. A secure bonded joint is obtained when the adhesive film is thermally melted using ultrasonic activation as described herein that is applied through the flooring, thereby ultrasonically welding the joint together. It bears noting that in some embodiments, the formulation of the resilient flooring product can be selected such that the interface of a joint in the resilient product itself without adhesive film is activated by the ultrasonic vibration and welded. This concept was tested and good spot welds on a Luxe brand flooring product were obtained via applying ultrasonic vibrations without the 3M film.

An exemplary method for installing a flooring system 50 will now be described with reference to FIGS. 1-3. This method will be described using plank-type floor panels 100; however, the same process may be used for floor panels of other polygonal shapes such as squares, etc. The floor panel edges in this process being described have shiplap edge details as described herein and shown in FIGS. 1-3. Other type edge details may be used and bonded together using the same methodology.

A first floor panel 100 and a second floor panel 100 are first provided. The method continues by applying a thermally activated solid adhesive to the coupling surface 108 disposed along a longitudinal peripheral edge 112 of the first floor panel 100 (see, e.g. FIG. 1). The solid adhesive may be a solid adhesive film 200. In the embodiment shown, the adhesive film 200 is applied to an upward facing coupling surface of floor panel 100. However, the film 200 may alternatively be applied to a downward facing coupling surface instead in other embodiments.

The method continues by positioning the first floor panel 100 on a flooring substrate 60 (see, e.g. FIG. 3). It bears noting that the solid adhesive film 200 has not been activated at this point in the flooring installation process.

The method continues by positioning a second floor panel 100 on the flooring substrate 60 adjacent to the first floor panel 100 and locating the coupling surface 108 of the second floor panel proximate to the solid adhesive film 200 on the first floor panel 100.

Next, the method continues with heating the solid adhesive film 200 and bonding the coupling surfaces 108 of the first and second floor panels 100 together to join the panels (see FIG. 3). The heating step may include applying ultrasonic vibrations to the solid adhesive film 200, which may be transmitted through the top surface 102 of the first or second floor panel at the joint 114 to the solid adhesive below by the actuator 300 of ultrasonic unit 302. The ultrasonic vibrations may be applied by contacting the top surfaces 102 of the first and/or second floor panels with the actuator 300. While continuing to maintain contact with the tops surface(s) 102, the actuator 300 may be slid or rolled in a longitudinal direction along the joint 114 for the entire length of the joint being bonded to create secure joining of the first and second floor panels 100.

The foregoing process may be repeated for installing and bonding additional floor panels 100.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

The invention claimed is:

1. A flooring system comprising:
   a first floor panel and a second floor panel, each of the first and second floor panels comprising:
      a first layer having a top surface opposite a bottom surface, and a plurality of peripheral edges extending between the top and bottom surfaces of the first layer;
      a second layer having a top surface opposite a bottom surface, and a plurality of peripheral edges extending between the top and bottom surfaces of the second layer; and
      a third layer comprising a thermally activated solid adhesive that is comprised of a thermoplastic material that does not melt and bond the coupling surfaces of the first and second floor panel together until the creation of heat in the joint;
   wherein the bottom surface of the first layer is coupled to the top surface of the second layer in an offset relationship that defines a first offset marginal portion and a second offset marginal portion; and
   wherein the third layer is positioned between the first and second layers and the third layer covers at least a part of the first or second offset marginal portions and spans a length of a coupling portion of each of the bottom surface of the first layer and the top surface of the second layer.

2. The flooring system of claim 1, wherein the adhesive is activated by acoustic vibration having a frequency in the range of from about 15 kHz to about 50 kHz.

3. The flooring system of claim 1, wherein the thermoplastic material is selected from a polyester, a polyimide, and a combination thereof.

4. The flooring system of claim 1, wherein the thermoplastic material is a non-curing thermoplastic material.

5. The flooring system of claim 1, wherein the first offset marginal portion and the second offset marginal portion are substantially planar.

6. The flooring system of claim 1, wherein the coupling portion of the first floor panel faces in an upwards direction and the coupling portion of the second floor panel faces in a downward direction.

7. The flooring system of claim 6, wherein the first and second flooring panels have shiplap edges that define the first and second coupling surfaces.

8. The flooring system of claim 1, wherein the solid adhesive is a thermal bonding film.

9. The flooring system of claim 1, wherein the first and second floor panels comprise resilient vinyl flooring.

10. The flooring system of claim 1, wherein the first and second floor panels have an elongated plank shape comprising a pair of opposing longitudinal edges and a pair of opposing lateral edges, the longitudinal edges having a length larger than a width of the lateral edges.

11. A flooring system comprising:
    a first floor panel and a second floor panel, each of the first and second floor panels comprising:
       a top surface, a bottom surface, a pair of longitudinal shiplap edges, and a pair of lateral edges; and
       a coupling surface formed on each shiplap edge;
    the coupling surface of one shiplap edge of the first floor panel being disposed proximate to the coupling surface of one shiplap edge of the second floor panel forming an adjacent pair of coupling surfaces; and
    a thermally activated solid adhesive film interspersed between the adjacent pair of coupling surfaces of the first and second floor panel, the thermally activated solid adhesive film comprising a thermoplastic material;
    wherein the solid adhesive film is comprised of a material that does not melt and bond the adjacent pair of coupling surfaces together until the creation of heat in the joint.

12. The flooring system of claim 11, wherein the adhesive is activated by acoustic vibration having a frequency in the range of from about 15 kHz to about 50 kHz.

13. The flooring system of claim 11, wherein the thermoplastic material is selected from a polyester, a polyimide, and a combination thereof.

14. The flooring system of claim 11, wherein the thermoplastic material is a non-curing thermoplastic material.

15. The flooring system of claim 11, wherein the coupling surfaces are substantially planar.

16. The flooring system of claim 11, wherein each of the first and second floor panels includes a downward facing coupling surface and an upward facing coupling surface.

17. The flooring system of claim 11, wherein the upward facing coupling surface of the first panel is disposed proximate to the downward facing coupling surface of the second floor panel.

18. The flooring system of claim 11, wherein the first and second floor panels comprise resilient vinyl flooring.

* * * * *